No. 876,334. PATENTED JAN. 14, 1908.
F. J. COOPER.
WHEEL.
APPLICATION FILED JUNE 16, 1906.
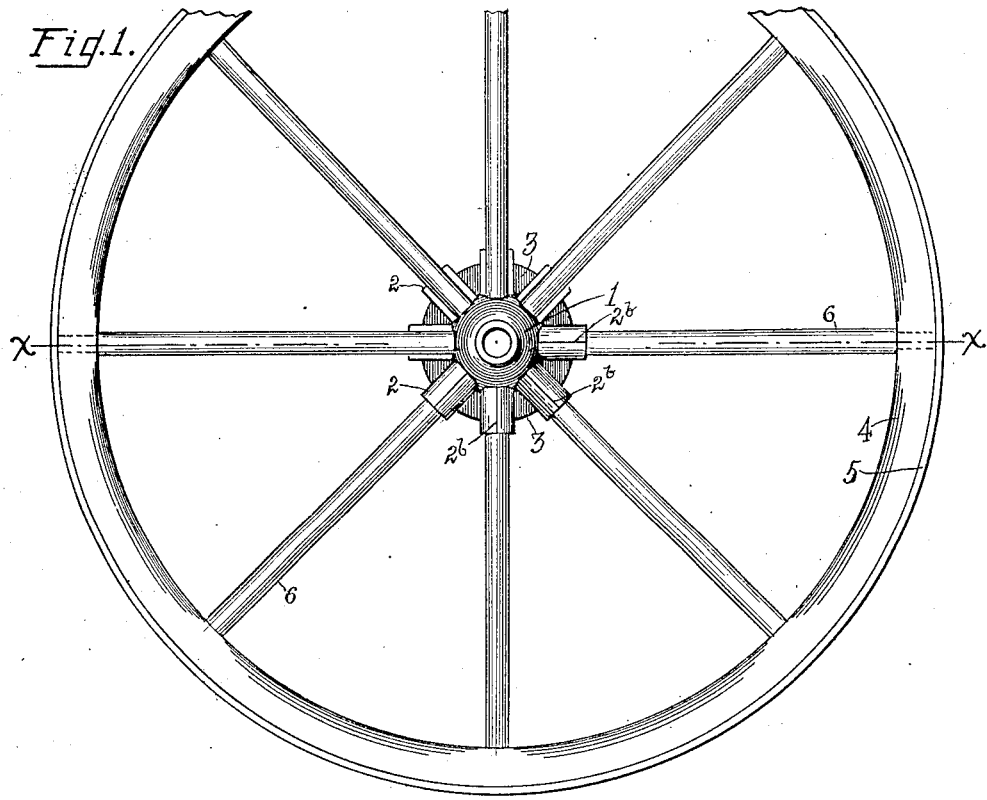
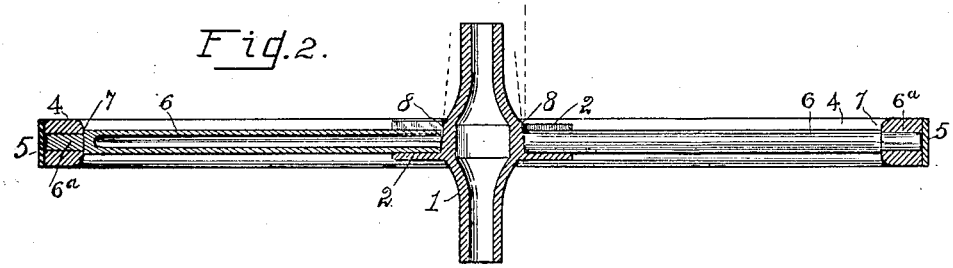
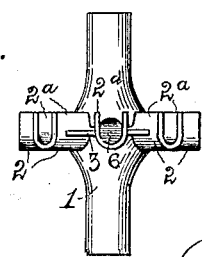
WITNESSES:
D. C. Walter
Ada Law
INVENTOR:—
Frank J. Cooper,
F. Huron Hall, Atty.

UNITED STATES PATENT OFFICE.

FRANK J. COOPER, OF TOLEDO, OHIO, ASSIGNOR OF ONE-HALF TO JOHN M. SKINNER, OF TOLEDO, OHIO.

WHEEL.

No. 876,334.

Specification of Letters Patent.

Patented Jan. 14, 1908.

Application filed June 16, 1906. Serial No. 322,069.

*To all whom it may concern:*

Be it known that I, FRANK J. COOPER, a citizen of the United States, residing at Toledo, in the county of Lucas and State of Ohio, have invented certain new and useful Improvements in Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wheels of that class which is especially well adapted for use in wheelbarrows and agricultural machinery, and is designed to furnish a construction which shall be simple and cheap and which shall be exceedingly strong, rigid, and durable. I attain these objects by means of the devices and arrangement of parts hereinafter described and shown, and illustrated in the accompanying drawings, in which—

Figure 1 is a side elevation of my wheel; Fig. 2, a sectional plan-view taken on line $x$—$x$ Fig. 1, and Fig. 3, a top-plan view of the hub of my wheel detached with a single spoke in place and shown before the operation of forming the spoke-socket, as hereinafter described.

Like numerals of reference indicate like parts in all the figures.

In the drawings, 1 is the hub of my wheel having an axial bore therethrough and having short radial arms 2 formed U-shape in cross-section as illustrated in Fig. 3. These arms are connected by V-shaped webs 3 which give strength to the hub and its arms. The hub the arms and the web are formed integral of malleable iron or other suitable ductile metal.

4 is the rim of my wheel formed of wood, if preferred, or metal.

5 is the tire.

6—6 are spokes consisting of metal rods or tubes having at their outer extremity reduced portions $6^a$, forming shoulders 7.

The rim is bored or punched at proper intervals to receive the reduced end-portions of the spokes, as illustrated in Fig. 2. The radial arms 2 present a series of trough-like recesses the inner ends of which are inclined or beveled, as at 8, as illustrated in Fig. 2.

My wheel is assembled as follows: The spokes have their reduced outer end-portions 6 inserted into the corresponding holes in the rim. The inner ends of the spokes are now dropped into the trough-like recesses in the radial arms of the hub. The spokes are of such length that their inner ends rest and abut against the beveled ends of the recesses in the hub-arms. Now the spokes must be driven or forced transversely at their inner ends to enter them into the recesses of the hub-arms. This, by the wedge-like action of the inclined parts 8, forces each of the spokes endwise outwardly so that the shoulders 7 are in close contact with the rim and so that the spokes and the rim are now under tension. The lips or flanges $2^a$ of the radial hub-arms are next, by means of a suitable die and press, and by a single operation, bent toward each other so that their edges meet, as at $2^b$ in Fig. 1. The spokes' inner ends are now strongly clamped and gripped in the sockets formed by the closing of the lips or flanges of the hub-arms. It will be seen that both sides of the hub now present the same appearance and that rattling and the lateral and longitudinal movements of the inner ends of the spokes are rendered impossible. The hub, being of a single casting, is inexpensive and the operation of assembling the parts of the wheel is quickly and cheaply performed.

Having described my invention, what I claim and desire to secure by Letters Patent is,—

A wheel comprising a rim, a series of spokes abutting against the rim, a hub having a corresponding series of hollow radial arms integral with the hub, said arms being cleft longitudinally and adapted to receive laterally the inner ends of the spokes, adapted also to be bent from open to closed form to furnish spoke-sockets, and beveled portions upon the hub at the inner ends of the recesses against which beveled portions the inner ends of the spokes abut.

In testimony whereof I affix my signature in presence of two witnesses.

FRANK J. COOPER.

Witnesses:
 CLEM. V. WAGNER,
 ADA LAW.